US012531398B2

(12) United States Patent
Feng et al.

(10) Patent No.: US 12,531,398 B2
(45) Date of Patent: Jan. 20, 2026

(54) THREADING DEVICE (71) Applicant: Taizhou Dawei Electric Appliance Co., Ltd., Taizhou (CN)

(72) Inventors: Zao Feng, Taizhou (CN); Hao Liu, Taizhou (CN); Ning Liu, Taizhou (CN)

(73) Assignee: Taizhou Dawei Electric Appliance Co., Ltd., Taizhou (CN)

( * ) Notice: Subject to any disclaimer, the term of this patent is extended or adjusted under 35 U.S.C. 154(b) by 454 days.

(21) Appl. No.: 18/335,602

(22) Filed: Jun. 15, 2023

(65) Prior Publication Data
US 2024/0170932 A1 May 23, 2024

(30) Foreign Application Priority Data

Nov. 22, 2022 (CN) .......................... 202211468495.1

(51) Int. Cl.
*H02G 1/08* (2006.01)
(52) U.S. Cl.
CPC ............ *H02G 1/083* (2013.01); *H02G 1/085* (2013.01)
(58) Field of Classification Search
CPC .. B08B 1/00; B08B 1/001; B08B 1/02; B08B 1/04; B08B 9/045; B65H 2701/376; E03C 1/30; E03C 1/302; E03F 9/005; H02G 1/083–086; H02G 1/088; H02G 9/06; H02G 9/065; H02G 9/08
See application file for complete search history.

(56) References Cited

U.S. PATENT DOCUMENTS

| 3,837,624 A * | 9/1974 | Dandurand ............ H02G 1/086 226/97.1 |
| 2010/0046895 A1 | 2/2010 | Barker |
| 2022/0140579 A1 | 5/2022 | Liu et al. |

FOREIGN PATENT DOCUMENTS

| CN | 211829973 U | * 10/2020 |
| DE | 102019113923 A1 | 1/2020 |
| DE | 102022103097 B3 | 4/2023 |

* cited by examiner

Primary Examiner — Tyrone V Hall, Jr.

(57) ABSTRACT

The present invention provides a threading device, wherein a bent pipe converging device in the threading device is rotationally disposed on a first rotating shaft through a first sleeve, an annular gasket and a clamp spring, the bent pipe converging device can rotate up and down and also can swing left and right, a rope arrangement auxiliary device consisting of a rope arrangement plate, a first eccentric wheel with a first push rod and a rope arrangement motor is disposed on an inward outlet of the bent pipe converging device, a first sliding groove and a second sliding groove are disposed on the rope arrangement plate in parallel, a sliding direction of the first sliding groove and the second sliding groove is perpendicular to a reciprocating direction of the rope arrangement plate, and the internal outlet of the bent pipe converging device and the first push rod are inserted into the first sliding groove and the second sliding groove, respectively; by such a configuration, the first eccentric wheel can enable the bent pipe converging device to reciprocate left and right during take-up under the driving of the rope arrangement motor, and a wire rope taken up on a wire wheel cannot be intensively wound together to generate a wire clamping phenomenon, so that the wire rope on the wire wheel is collected more evenly.

10 Claims, 9 Drawing Sheets

THREADING DEVICE

TECHNICAL FIELD

The present invention relates to the technical field of auxiliary threading tools, and in particular to a threading device.

BACKGROUND

Various pipelines of strong current, weak current, fire fighting and the like in constructional engineering are usually pre-buried or exposed in a building structure, when wires and cables are installed in the later period, a threading tool needs to penetrate through the pipelines firstly, then the wires and the cables are pulled through the pipelines, and the tool is a threading device.
In Chinese Patent Application No. 202111601820.2, disclosed is a threading device suitable for a building electrical pipeline, which comprises a fan, a take-up and pay-off main machine and a connecting hose. In this threading device, a bent pipe converging device only swings up and down but cannot swing left and right, and meanwhile, the threading device lacks a rope arrangement auxiliary device for the bent pipe converging device to swing left and right; consequently, when this threading device takes up a wire, the wire ropes are easy to intensively wind and stack together, and the wires of each layer are also easy to be clamped with each other, thereby affecting the normal pay-off after the wire is taken up.
Therefore, the prior art remains to be improved and developed.

SUMMARY

The purpose of the present invention is to provide a threading device so as to solve the technical problems of the threading device in the prior art.
The present invention provides the following contents.
A threading device comprises: a fan, a take-up and pay-off main machine and a connecting hose, wherein the take-up and pay-off main machine comprises a ventilation bin, a wire wheel bin and an electric bin; a fan connector and a hose connector are disposed on the ventilation bin, an air channel communicating with the fan connector and the hose connector is disposed in the ventilation bin, the connecting hose is connected to the hose connector, and the fan is connected to the fan connector; the electric bin and the wire wheel bin are coaxially disposed side by side, the ventilation bin is communicated with a side wall of the wire wheel bin, a first partition plate is disposed between the ventilation bin and the wire wheel bin, a wire wheel is disposed in the wire wheel bin, a wire wheel clutch driving device is disposed in the electric bin, a bent pipe converging device is disposed in the ventilation bin through a first rotating shaft, a converging device lifting torsion spring is disposed on the first rotating shaft in a penetrating manner, and a bent pipe through hole configured for the bent pipe converging device to penetrate through is disposed on the first partition plate, wherein an arc-shaped first clamping portion is disposed on the first rotating shaft, a first sleeve is disposed on the first clamping portion, an outward outlet of the bent pipe converging device is disposed in the first sleeve in a penetrating manner and is in clearance fit with the first sleeve, an annular groove is disposed in the bent pipe converging devices at two ends of the first sleeve, and a first annular gasket and a clamp spring that are configured to prevent the bent pipe converging device from being separated from the first sleeve are disposed in the annular groove; one end of the converging device lifting torsion spring is inserted into an inner wall of the ventilation bin, and the other end of the converging device lifting torsion spring is lapped on the first sleeve;

a rope arrangement auxiliary device is disposed at the bent pipe through hole of the first partition plate and comprises a rope arrangement plate and a reciprocating driving assembly of the rope arrangement plate, a first sliding groove and a second sliding groove are disposed on the rope arrangement plate in parallel, a sliding direction of the first sliding groove and the second sliding groove is perpendicular to a reciprocating direction of the rope arrangement plate, and an inward outlet of the bent pipe converging device penetrates through the first sliding groove; and the reciprocating driving assembly of the rope arrangement plate comprises a first eccentric wheel with a first push rod and a rope arrangement motor configured to drive the first eccentric wheel to rotate, the first push rod of the first eccentric wheel is inserted into the second sliding groove, and the reciprocating driving assembly of the rope arrangement plate is disposed in the electric bin.

In an optional embodiment of the present invention, an L-shaped magnetic sleeve mounting bracket is disposed on the first sleeve, an arc-shaped second clamping portion is disposed at one end of the L-shaped magnetic sleeve mounting bracket, a magnetic sleeve is connected to the other end of the L-shaped magnetic sleeve mounting bracket, the L-shaped magnetic sleeve mounting bracket is fixed on the first sleeve through the second clamping portion, a first magnet is disposed on the magnetic sleeve, a first switch-type Hall sensor configured to fit the first magnet is disposed on the inner wall of the ventilation bin, and the converging device lifting torsion spring is indirectly lapped on the first sleeve through the L-shaped magnetic sleeve mounting bracket.

In an optional embodiment of the present invention, a wire wheel braking device is further provided in the wire wheel bin, and the wire wheel braking device comprises a brake pad rotatably connected in the wire wheel bin and disposed adjacent to the wire wheel, a brake pad deflecting torsion spring configured to drive the brake pad to rotate so as to contact with an outer periphery of the wire wheel, and a first electromagnet and a lifting rod configured to drive the brake pad to separate from the outer periphery of the wire wheel against an elastic force of the brake pad deflecting torsion spring by rising and lifting;

the brake pad comprises a first L-shaped connecting sheet and a second L-shaped connecting sheet that are symmetrically disposed in parallel, and friction sheets that are connected to a right-angle position of the first L-shaped connecting sheet and a right-angle position of the second L-shaped connecting sheet; the first L-shaped connecting sheet and the second L-shaped connecting sheet are rotatably connected in the wire wheel bin in an inverted L shape by using a second rotating shaft; a cross rod is disposed at ends that are of the first L-shaped connecting sheet and the second L-shaped connecting sheet and that are in a non-rotating connection in a penetrating manner;

the electromagnet is disposed above the brake pad, and the lifting rod penetrates through a gap enclosed by the cross rod, the first L-shaped connecting sheet, the second L-shaped connecting sheet and the friction sheet; and an inclined plane configured to drive the friction sheet to be separated from the wire wheel by squeezing and pushing the cross rod when the lifting rod rises is disposed at one end of the lifting rod penetrating through the gap.

In an optional embodiment of the present invention, an air door pay-off control device is disposed in the ventilation bin at one side of the fan connector, and the air door pay-off control device comprises an air door rotatably disposed in an air inlet of the ventilation bin through a side rotating shaft, an air door torsion spring sleeved on the side rotating shaft and configured to drive the air door to close the air inlet, a second magnet disposed on a lower edge of the air door, and a second switch-type Hall sensor disposed at a bottom of the ventilation bin and configured to fit the second magnet.

In an optional embodiment of the present invention, a first clamping groove and a second clamping groove are disposed at a top of a side wall and a bottom of a side wall of the ventilation bin at one side of the fan connector, respectively; a top end and a bottom end of the side rotating shaft are clamped into the first clamping groove and the second clamping groove, respectively; and a first pressing cover configured to limit the separation of the top end of the side rotating shaft from the first clamping groove is disposed on the first clamping groove, and a second pressing cover configured to limit the separation of the bottom end of the side rotating shaft from the second clamping groove is disposed on the second clamping groove.

In an optional embodiment of the present invention, the wire wheel bin and the electric bin are separated by a second partition plate, a transmission shaft is disposed at the center of the second partition plate in a penetrating manner, a torsion spring mounting groove is disposed at the center of the wire wheel, a transmission torsion spring is disposed in the torsion spring mounting groove, the transmission shaft penetrates through a bottom of the torsion spring mounting groove and the transmission torsion spring, the transmission torsion spring comprises an inward-folding support arm and an outward-extending support arm, the inward-folding support arm is disposed on the transmission shaft in a penetrating manner, a hanging rod is disposed at the bottom of the torsion spring mounting groove near the transmission torsion spring, the outward-extending support arm is connected to the hanging rod, and the transmission shaft drives the wire wheel to rotate through the transmission torsion spring.

In an optional embodiment of the present invention, the wire wheel clutch driving device is further disposed in the electric bin, and comprises a cover-shaped mounting seat mounted on the second partition plate and covering a region where the transmission shaft is located, a driven gear and a driving gear that are enclosed between the cover-shaped mounting seat and the second partition plate and are in internal meshing transmission, a take-up motor configured to drive the driving gear to rotate, and a clutch control mechanism configured to control the meshing or separation of the driving gear and the driven gear;

the clutch control mechanism comprises a motor fixing seat that is disposed on the cover-shaped mounting seat in a swinging mode and is provided with an extending swing arm, a tension spring of which two ends are respectively connected to the motor fixing seat and an inner side wall of the electric bin and that is configured to keep the driven gear and the driving gear meshed, and an eccentric wheel clutch control assembly that is configured to fit the extending swing arm of the motor fixing seat to control the operation of the driving gear and the driven gear; and the take-up motor is mounted on the motor fixing seat, and an output shaft of the take-up motor penetrates through a shaft through hole in the motor fixing seat and a shaft swinging hole in the cover-shaped mounting seat and is connected to the driving gear.

In an optional embodiment of the present invention, the eccentric wheel clutch control assembly comprises a second eccentric wheel with a second push rod and a clutch motor configured to drive the second eccentric wheel to rotate, the second push rod comprises a second screw seat integrally formed on an outer edge of the second eccentric wheel, a second screw connected to the second screw seat, and a second sleeve sleeved on the second screw, and the second push rod is in contact with the extending swing arm of the motor fixing seat through the second sleeve.

In an optional embodiment of the present invention, a main power supply knob is disposed on the wire wheel bin, the main power supply knob comprises a knob portion, a cam portion, and a connecting shaft portion configured to connect the knob portion and the cam portion, the knob portion is disposed outside the wire wheel bin, the cam portion is disposed inside the wire wheel bin, the connecting shaft portion penetrates through a side wall of the wire wheel bin, a plurality of positioning pits are disposed on an outer wall of the wire wheel bin corresponding to the knob portion, a positioning groove adapted to the positioning pit is disposed on the knob portion, a steel ball spring gear-shifting limiting mechanism is disposed in the positioning groove, and the wire wheel bin is further provided with a first microswitch configured to trigger the cam portion.

In an optional embodiment of the present invention, the take-up and pay-off main machine further comprises a take-up and pay-off switch circuit, and the take-up and pay-off switch circuit comprises a three-gear adjusting operation switch, an air blowing button, the main power supply knob, the first microswitch, a power supply conversion module, a second microswitch, a third microswitch, the first electromagnet, the fan, the take-up motor, the clutch motor, the first switch-type Hall sensor, the second switch-type Hall sensor, a first direct-current relay, a second direct-current relay, and a third direct-current relay; the three-gear adjusting operation switch comprises a threading gear, a standby gear and a take-up gear; and the power supply conversion module is configured to enable an external power supply connected by a plug to perform alternating current-direct current conversion and voltage step-down into an internal power supply;

when the threading device is used, the main power supply knob is rotated to switch on the first microswitch and power on the external power supply;

when the three-gear adjusting operation switch is switched from the standby gear to the threading gear, the fan is conducted with the external power supply, the air door rotates under the action of wind power of the fan, and the second magnet of the air door is close to the second switch-type Hall sensor; the second switch-type Hall sensor is closed, and the second electromagnet of the first direct-current relay is conducted with the internal power supply; a second electromagnet drives a first contact switch of the first direct-current relay to be closed and conduct the first electromagnet, so that the lifting rod drives the brake pad to release the brake on the wire wheel;

when the three-gear adjusting operation switch is switched from the threading gear to the standby gear, the fan is powered off, and the second electromagnet of the first direct-current relay is also powered off; the first contact switch of the first direct-current relay is switched off, and the first electromagnet is powered off; the brake pad restores the brake on the wire wheel;

when the three-gear adjusting operation switch is switched from the standby gear to the take-up gear, the bent pipe converging device is initially in an original position, the first magnet on the magnetic sleeve is close to the first switch-type Hall sensor, and the first switch-type Hall sensor is closed; a third electromagnet of the second direct-current relay is conducted with the internal power supply; the third electromagnet drives a second contact switch of the second direct-current relay to switch to conduct the first electromagnet, so that the lifting rod drives the brake pad to release the brake on the wire wheel; the third electromagnet drives a third contact switch of the second direct-current relay to switch to conduct the take-up motor and the rope arrangement motor; synchronously, a fourth electromagnet of the third direct-current relay is conducted, and the fourth electromagnet drives a fourth contact switch and a fifth contact switch of the third direct-current relay to switch to conduct a forward rotation circuit of the clutch motor; the clutch motor rotates forwards until the second eccentric wheel on the clutch motor is in contact with the third microswitch, and the forward rotation circuit is disconnected;

when the three-gear adjusting operation switch is switched from the take-up gear to the standby gear, the fourth electromagnet of the third direct-current relay is powered off, and the fourth electromagnet drives the fourth contact switch and the fifth contact switch of the third direct-current relay to switch to conduct the reverse rotation circuit of the clutch motor; the clutch motor rotates reversely until the second eccentric wheel on the clutch motor is in contact with the second microswitch, and a reverse rotation circuit is disconnected;

when only air blowing is needed, the three-gear adjusting operation switch is located at the standby gear, the air blowing button is pressed, the air blowing button enables the fan to be conducted with the external power supply, and the fan is powered on to blow air; and when maintenance is needed, the main power supply knob is rotated to switch off the first microswitch and disconnect the external power supply.

The beneficial effects are as follows: the present invention provides a threading device, wherein a bent pipe converging device in the threading device is rotationally disposed on a first rotating shaft through a first sleeve, an annular gasket and a clamp spring, the bent pipe converging device can rotate up and down and also can swing left and right, a rope arrangement auxiliary device consisting of a rope arrangement plate, a first eccentric wheel with a first push rod and a rope arrangement motor is disposed on an inward outlet of the bent pipe converging device, a first sliding groove and a second sliding groove are disposed on the rope arrangement plate in parallel, a sliding direction of the first sliding groove and the second sliding groove is perpendicular to a reciprocating direction of the rope arrangement plate, and the internal outlet of the bent pipe converging device and the first push rod are inserted into the first sliding groove and the second sliding groove, respectively; by such a configuration, the first eccentric wheel can enable the bent pipe converging device to reciprocate left and right during take-up under the driving of the rope arrangement motor, and a wire rope taken up on a wire wheel cannot be intensively wound together to generate a wire clamping phenomenon, so that the wire rope on the wire wheel is collected more evenly.

Reference numerals in the drawing are as follows:

10: fan; 20: take-up and pay-off main machine; 30: connecting hose; 40: ventilation bin; 50: wire wheel bin; 60: electric bin; 70: fan connector; 80: hose connection; 90: air channel; 100: first partition plate; 110: wire wheel; 120: first rotating shaft; 130: bent pipe converging device; 140: converging device lifting torsion spring; 150: bent pipe through hole; 160: first clamping portion; 170: first sleeve; 180: an annular groove; 190: first annular gasket; 200: clamp spring; 210: rope arrangement auxiliary device; 220: rope arrangement plate; 240: first sliding groove; 250: second sliding groove; 260: first push rod; 270: first eccentric wheel; 280: rope arrangement motor; 290: L-shaped magnetic sleeve mounting bracket; 300: second clamping portion; 310: magnetic sleeve; 320: first magnet; 330: first switch-type Hall sensor; 340: wire wheel braking device; 350: brake pad; 360: brake pad deflecting torsion spring; 370: first electromagnet; 380: lifting rod; 390: first L-shaped connecting sheet; 400: second L-shaped connecting sheet; 410: friction sheet; 420: cross bar; 430: inclined plane; 440: air door pay-off control device; 450: air door; 460: air door torsion spring; 470: second magnet; 480: second switch-type Hall sensor; 490: first clamping groove; 500: second clamping groove; 510: first pressing cover; 520: second pressing cover; 530: second partition plate; 540: transmission shaft; 550: torsion spring mounting groove; 560: transmission torsion spring; 570: inward-folding support arm; 580: outward-extending support arm; 590: hanging rod; 610: cover-shaped mounting seat; 620: driven gear; 630: driving gear; 640: take-up motor; 650: extending swing arm; 660: motor fixing seat; 670: tension spring; 680: eccentric wheel clutch control assembly; 690: shaft through hole; 700: shaft swinging hole; 710: second push rod; 720: second eccentric wheel; 730: clutch motor; 740: second screw seat; 750: second screw; 760: second sleeve; 780: main power supply knob; 790: knob portion; 800: cam portion; 810: connecting shaft portion; 820: positioning pit; 1400: positioning groove; 830: steel ball spring gear-shifting limiting mechanism; 840: first microswitch; 850: three-gear adjusting operation switch; 860: air blowing button; 870: power supply conversion module; 880: second microswitch; 890: third microswitch; 900: first direct-current relay; 910: second direct-current relay; 920: third direct-current relay; 930: threading gear; 940: standby gear; 950: take-up gear; 900*a*: second electromagnet; 900*b*: first contact switch; 910*a*: third electromagnet; 910*b*: second contact switch; 910*c*: third contact switch; 920*a*: fourth electromagnet; 920*b*: fourth contact switch; and 920*c*: fifth contact switch.

DETAILED DESCRIPTION OF THE EMBODIMENTS

The following clearly and completely describes the technical solutions in embodiments of the present invention with reference to the accompanying drawings in embodiments of the present invention. It is clear that the described embodiments are merely a part rather than all of embodiments of the present invention. All other embodiments obtained by those skilled in the art based on embodiments of the present invention without creative efforts shall fall within the protection scope of the present invention.

Figure 1:
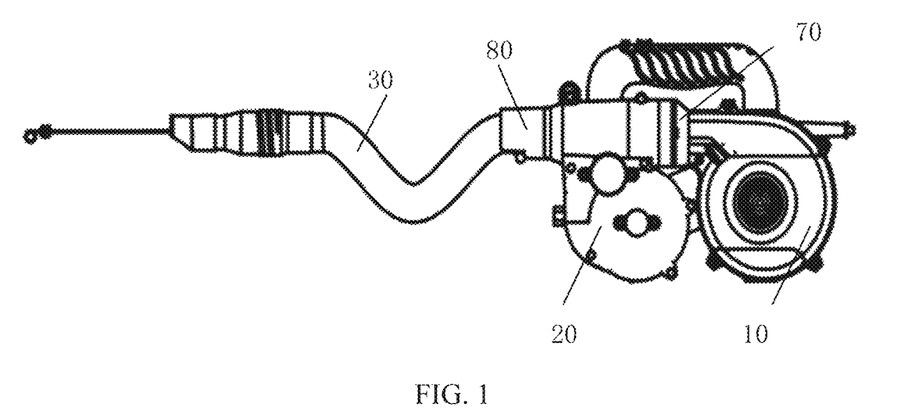
FIG. 1 is a schematic diagram of a structure of a threading device according to the present invention.
Figure 2:
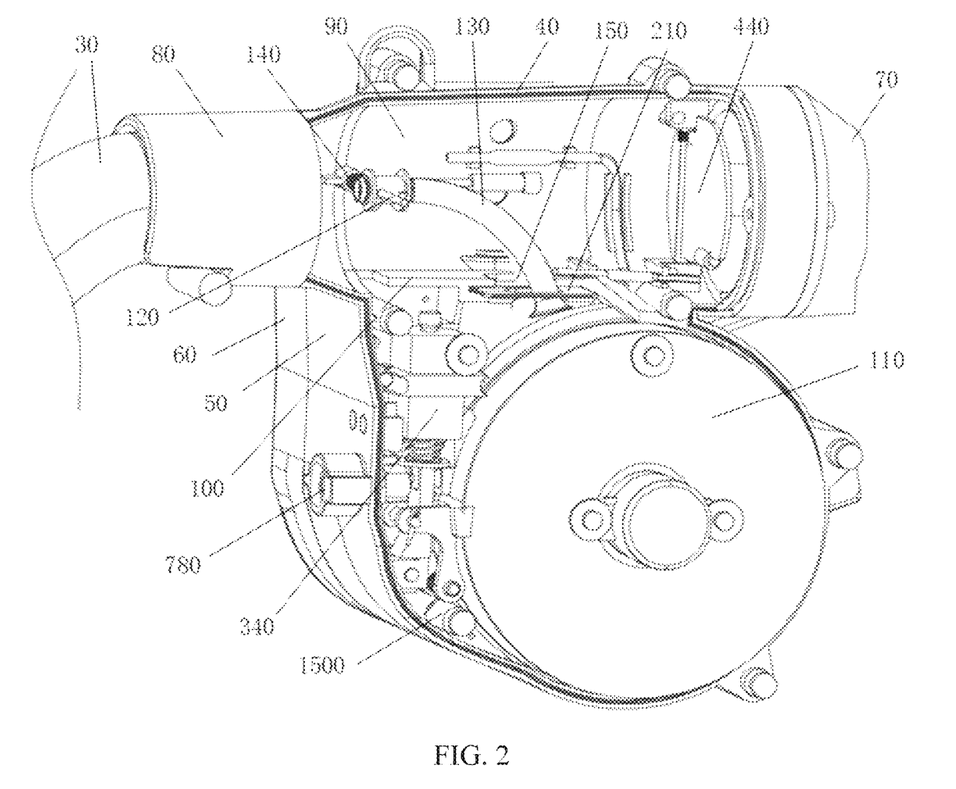
FIG. 2 is a schematic diagram of a structure of a wire wheel bin of a take-up and pay-off main machine that has a cover at one side opened according to the present invention.

Referring to FIG. 1, the present invention provides a threading device comprising a fan 10, a take-up and pay-off main machine 20 and a connecting hose 30; referring to FIG. 2, the take-up and pay-off main machine 20 comprises a ventilation bin 40, a wire wheel bin 50 and an electric bin 60; a fan connector 70 and a hose connector 80 are disposed on the ventilation bin 40, an air channel 90 communicating with the fan connector 70 and the hose connector 80 is disposed in the ventilation bin 40, the connecting hose 30 is connected to the hose connector 80, and the fan 10 is connected to the fan connector 70; the electric bin 60 and the wire wheel bin 50 are coaxially disposed side by side, the ventilation bin 40 is communicated with a side wall of the wire wheel bin 50, a first partition plate 100 is disposed between the ventilation bin 40 and the wire wheel bin 50, a wire wheel 110 is disposed in the wire wheel bin 50, a wire wheel clutch driving device is disposed in the electric bin 60, a bent pipe converging device 130 is disposed in the ventilation bin 40 through a first rotating shaft 120, a converging device lifting torsion spring 140 is disposed on the first rotating shaft 120 in a penetrating manner, and a bent pipe through hole 150 for the bent pipe converging device 130 to penetrate through is disposed on the first partition plate 100.

Figure 3:
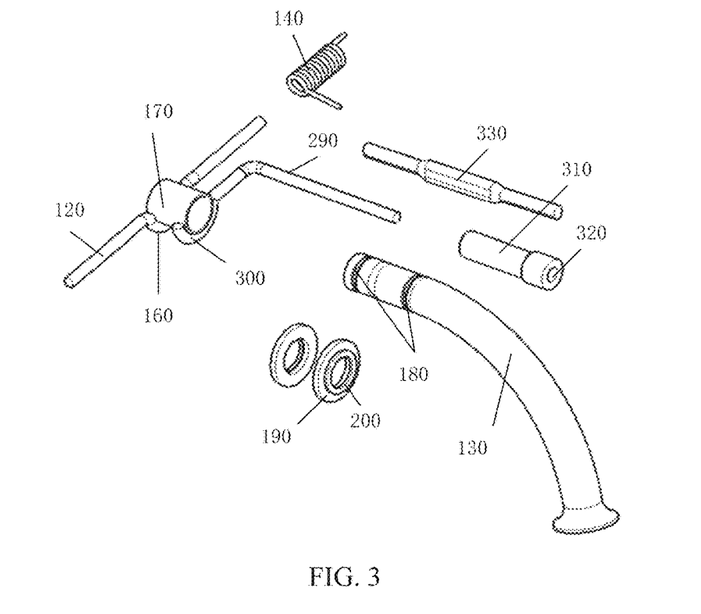
FIG. 3 is an exploded view of a mounting structure of a bent pipe converging device according to the present invention.
Figure 4:
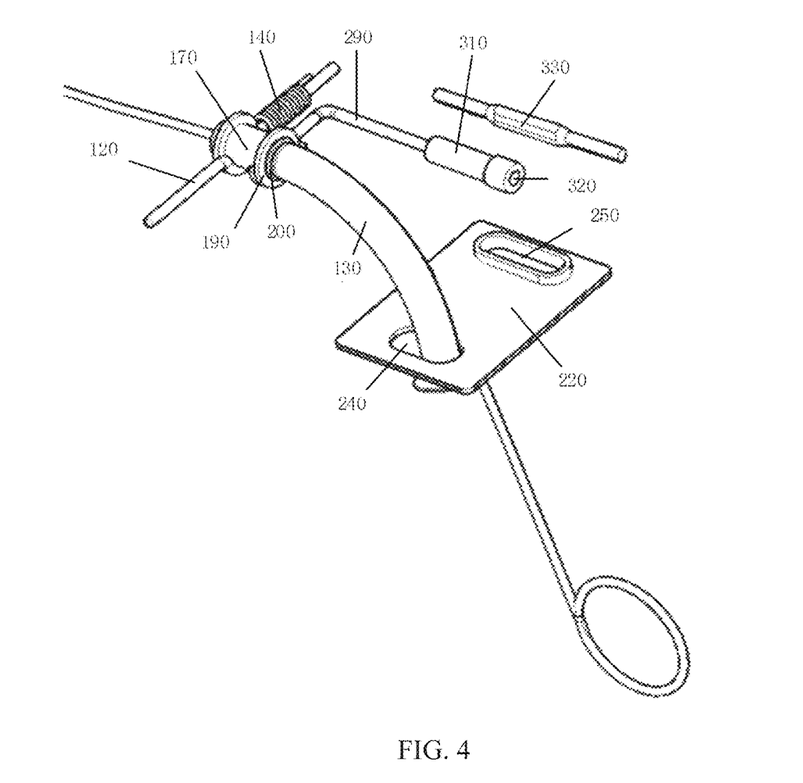
FIG. 4 is an assembly view of a mounting structure of a bent pipe converging device according to the present invention.

Referring to FIGS. 3 and 4, an arc-shaped first clamping portion 160 is disposed on the first rotating shaft 120, a first sleeve 170 is disposed on the first clamping portion 160, an outward outlet of the bent pipe converging device 130 is disposed in the first sleeve 170 in a penetrating manner and is in clearance fit with the first sleeve 170, an annular groove 180 is disposed in the bent pipe converging devices 130 at two ends of the first sleeve 170, and a first annular gasket 190 and a clamp spring 200 that are configured to prevent the bent pipe converging device 130 from being separated from the first sleeve 170 are disposed in the annular groove 180, wherein at two ends of the first sleeve 170, the first annular gasket 190 is close to the first sleeve 170, and the clamp spring 200 is disposed behind the first annular gasket 190; one end of the converging device lifting torsion spring 140 is inserted into an inner wall of the ventilation bin 40, and the other end of the converging device lifting torsion spring 140 is lapped on the first sleeve 170; and in the present invention, a coaxial gap of the outward outlet of the bent pipe converging device 130 is disposed in the first sleeve 170 in a penetrating manner, so that the bent pipe converging device 130 can swing left and right in the first sleeve 170 during the take-up process of the wire wheel 110, thereby avoiding the intensively accumulation and the cross of the wires during the take-up process and avoiding the problem of unsmooth take-up.

Figure 5:
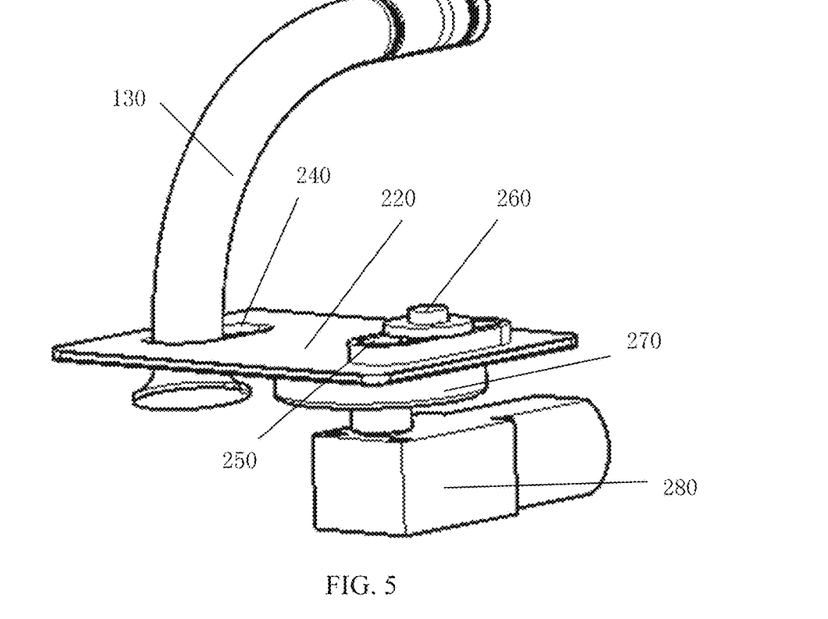
FIG. 5 is a schematic diagram of a structure of a rope arrangement auxiliary device according to the present invention.

Referring to FIG. 2, a rope arrangement auxiliary device 210 is disposed at the bent pipe through hole of the first partition plate 100, referring to FIG. 5, the rope arrangement auxiliary device 210 comprises a rope arrangement plate 220 and a reciprocating driving assembly of the rope arrangement plate, a first sliding groove 240 and a second sliding groove 250 are disposed on the rope arrangement plate 220 in parallel, a sliding direction of the first sliding groove 240 and the second sliding groove 250 is perpendicular to a reciprocating direction of the rope arrangement plate 220, the rope arrangement plate 220 is disposed to penetrate through the first partition board 100, the first sliding groove 240 is disposed at one side of the wire wheel bin 50, the second sliding groove 250 is disposed at one side of the electric bin, and an inward outlet of the bent pipe converging device 130 penetrates through the first sliding groove 240; and the reciprocating driving assembly of the rope arrangement plate comprises a first eccentric wheel 270 with a first push rod 260 and a rope arrangement motor 280 configured to drive the first eccentric wheel 270 to rotate, the first push rod 260 of the first eccentric wheel 270 is inserted into the second sliding groove 250, and the reciprocating driving assembly of the rope arrangement plate is disposed in the electric bin 60.

Referring to FIGS. 3 and 4, in an optional embodiment of the present invention, an L-shaped magnetic sleeve mounting bracket 290 is disposed on the first sleeve 170, an arc-shaped second clamping portion 300 is disposed at one end of the L-shaped magnetic sleeve mounting bracket 290, a magnetic sleeve 310 is connected to the other end of the L-shaped magnetic sleeve mounting bracket 290, the L-shaped magnetic sleeve mounting bracket 290 is fixed on the first sleeve 170 through the second clamping portion 300, a first magnet 320 is disposed on the magnetic sleeve 310, a first switch-type Hall sensor 330 (such as a normally open switch-type Hall sensor with the OKI model of GPS-01 or GPS-30) configured to fit the first magnet 320 is disposed on the inner wall of the ventilation bin 40, and the converging device lifting torsion spring 140 is indirectly lapped on the first sleeve 170 through the L-shaped magnetic sleeve mounting bracket 290.

Referring to FIG. 3, in an optional embodiment of the present invention, the inward outlet of the bent pipe converging device 130 is in a trumpet shape. In the present invention, the inward outlet of the bent pipe converging device 130 is in a trumpet shape, so that a wire rope can be prevented from being cut by the inward outlet of the bent pipe converging device 130 during the swinging of the wire rope.

Figure 7:
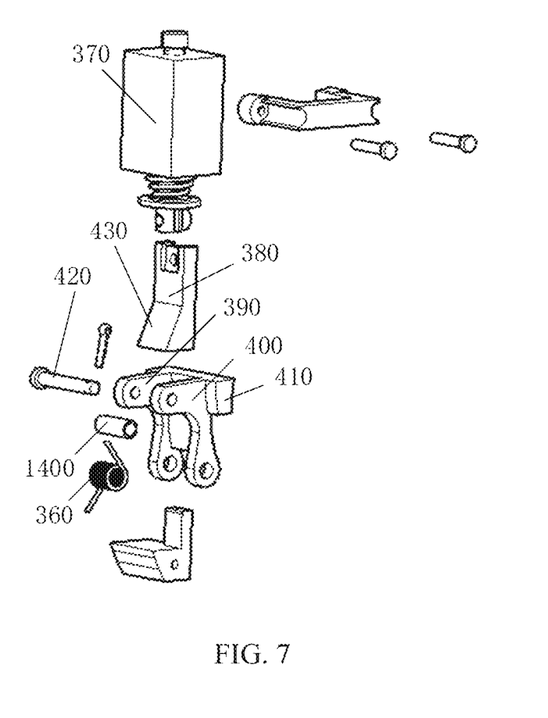
FIG. 7 is an exploded view of a wire wheel braking device according to the present invention.

Referring to FIG. 7, in an optional embodiment of the present invention, a rolling sleeve 1400 is provided on the cross bar 420 between the first L-shaped connecting sheet 390 and the second L-shaped connecting sheet 400. In the present invention, the rolling sleeve 1400 can change a hard contact between the lifting rod 380 and the cross bar 420 into a movable contact, thereby reducing friction and prolonging the service life of the lifting rod 380 and the cross bar 420.

Figure 6:
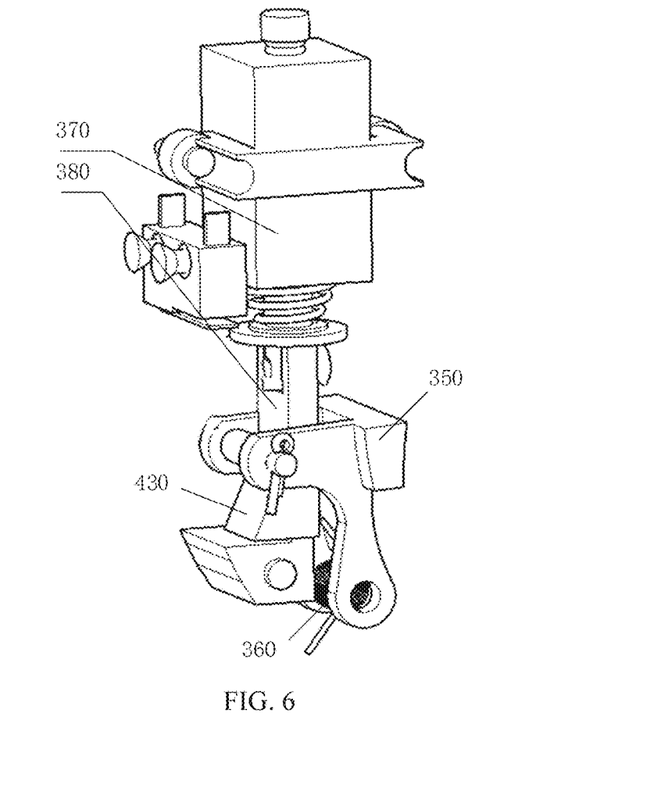
FIG. 6 is an assembly structural view of a wire wheel braking device according to the present invention.

Referring to FIG. 2, in an optional embodiment of the present invention, a wire wheel braking device 340 is further provided in the wire wheel bin 50, referring to FIG. 6, the wire wheel braking device 340 comprises a brake pad 350 rotatably connected in the wire wheel bin 50 and disposed adjacent to the wire wheel 110, a brake pad deflecting torsion spring 360 configured to drive the brake pad 350 to rotate so as to contact with an outer periphery of the wire wheel 110, and a first electromagnet 370 and a lifting rod 380 configured to drive the brake pad 350 to separate from the outer periphery of the wire wheel 110 against an elastic force of the brake pad deflecting torsion spring 360 by rising and lifting; and specifically, two ends of the brake pad deflecting torsion spring 360 of the present invention are in a V shape, and the V-shape portion shows a trend of angle expansion, one end of the brake pad deflecting torsion spring 360 is in contact with an upright column 1500 (referring to FIG. 2) preset in the wire wheel bin 50, and the other end of the brake pad deflecting torsion spring 360 is in contact with an inner surface of the brake pad 350 (i.e., a surface of the friction sheet 410 facing the cross bar 420), so that the brake pad deflecting torsion spring 360 can rotate the brake pad 350 toward the wire wheel 110.

Referring to FIG. 7, the brake pad 350 comprises a first L-shaped connecting sheet 390 and a second L-shaped connecting sheet 400 that are symmetrically disposed in parallel, and friction sheets 410 that are connected to a right-angle position of the first L-shaped connecting sheet 390 and a right-angle position of the second L-shaped connecting sheet 400; the first L-shaped connecting sheet 390 and the second L-shaped connecting sheet 400 are rotatably connected in the wire wheel bin 50 in an inverted L shape by using a second rotating shaft (the second rotating shaft penetrates through the through holes at the bottom ends of the first L-shaped connecting sheet 390 and the second L-shaped connecting sheet 400, and the brake pad deflecting torsion spring 360 is disposed on the second rotating shaft in a penetrating manner and is disposed between the through holes at the bottom ends of the first L-shaped connecting sheet 390 and the second L-shaped connecting sheet 400); and a cross rod 420 is disposed at ends that are of the first L-shaped connecting sheet 390 and the second L-shaped connecting sheet 400 and that are in a non-rotating connection in a penetrating manner.

The electromagnet is disposed above the brake pad 350, and the lifting rod 380 penetrates through a gap enclosed by the cross rod 420, the first L-shaped connecting sheet 390, the second L-shaped connecting sheet 400 and the friction sheet 410; and an inclined plane 430 configured to drive the friction sheet 410 to be separated from the wire wheel 110 by squeezing and pushing the cross rod 420 when the lifting rod 380 rises is disposed at one end of the lifting rod 380 penetrating through the gap. In the present invention, when the brake of the wire wheel 110 needs to be released, the first electromagnet 370 is powered on, the lifting rod 380 is carried by the first electromagnet 370 to rise, after the inclined plane 430 on the lifting rod 380 is in contact with the cross bar 420, under the action of the outward squeezing of the inclined plane 430, the cross bar 420 moves leftwards, so that the friction sheet 410 is driven to move leftwards through the first L-shaped connecting sheet 390 and the second L-shaped connecting sheet 400, and the brake of the friction sheet 410 is released.

Figure 8:
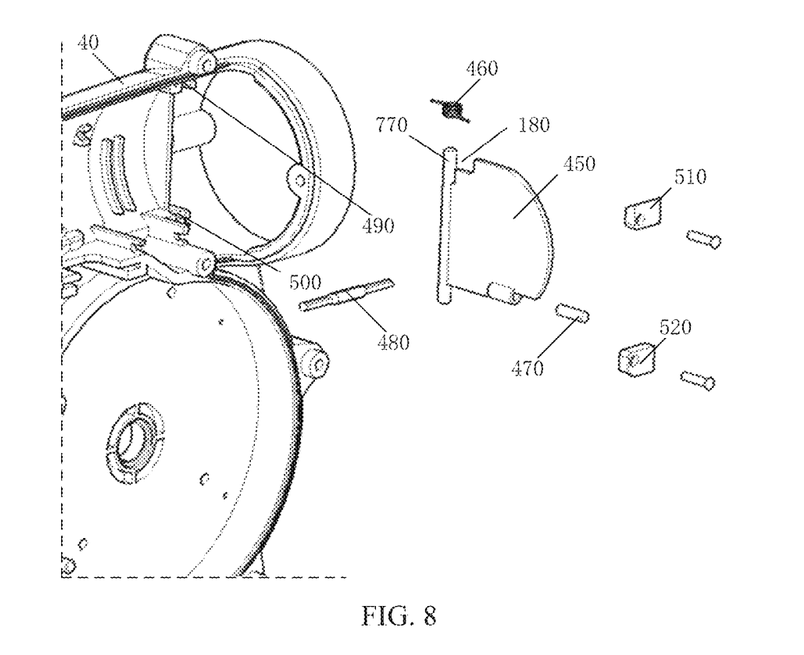
FIG. 8 is an exploded view of an air door pay-off control device according to the present invention.

Referring to FIG. 2, in an optional embodiment of the present invention, an air door pay-off control device 440 is disposed in the ventilation bin 40 at one side of the fan connector 70, referring to FIG. 8, the air door pay-off control device 440 comprises an air door 450 rotatably disposed in an air inlet of the ventilation bin 40 through a side rotating shaft 770, an air door torsion spring 460 sleeved on the side rotating shaft 770 and configured to drive the air door 450 to close the air inlet, a second magnet 470 disposed on a lower edge of the air door 450, and a second switch-type Hall sensor 480 (such as a normally open switch-type Hall sensor with the OKI model of GPS-01 or GPS-30) disposed at a bottom of the ventilation bin 40 and configured to fit the second magnet 470. Specifically, in the air door pay-off control device 440 of the present invention, if the pipeline to be threaded is blocked, the airflow in the pipeline to be threaded is reversely resisted by the airflow blown out by the fan 10, the flow rate of the airflow in the ventilation bin 40 becomes small, when the requirement for pushing the fan door 450 is not met, the second switch-type Hall sensor 480 is far away, the second switch-type Hall sensor 480 disconnects a power supply circuit of the first electromagnet of the braking device of the wire wheel 110, and then the wire wheel braking device brakes the wire wheel 110 to stop the pay-off of the wire wheel 110.

Referring to FIG. 8, in an optional embodiment of the present invention, a first clamping groove 490 and a second clamping groove 500 are disposed at a top of a side wall and a bottom of a side wall of the ventilation bin 40 at one side of the fan connector 70, respectively; a top end and a bottom end of the side rotating shaft 770 are clamped into the first clamping groove 490 and the second clamping groove 500, respectively, and the side rotating shaft 770 is in clearance fit with the first clamping groove 490 and the second clamping groove 500, so that the side rotating shaft 770 can rotate; and a first pressing cover 510 configured to limit the separation of the top end of the side rotating shaft 770 from the first clamping groove 490 is disposed on the first clamping groove 490, a second pressing cover 520 configured to limit the separation of the bottom end of the side rotating shaft 770 from the second clamping groove 500 is disposed on the second clamping groove 500, and the first pressing cover 510 and the second pressing cover 520 are fastened on the side wall of the ventilation bin 40 through screws.

Figure 9:
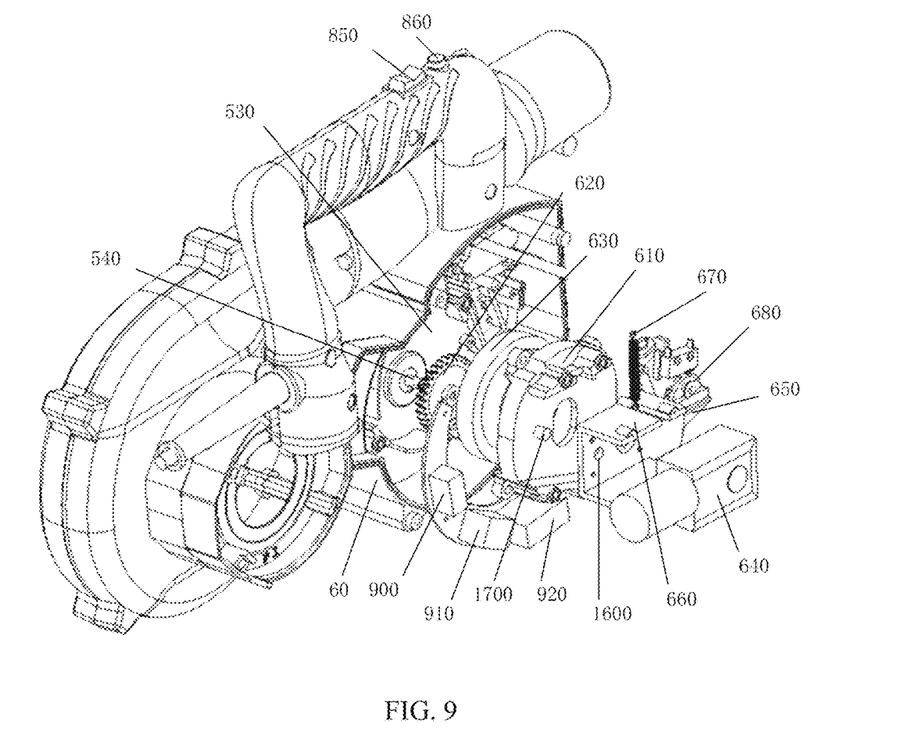
FIG. 9 is an exploded view of an electric bin of a take-up and pay-off main machine that has a cover at one side opened according to a first perspective of the present invention.
Figure 10:
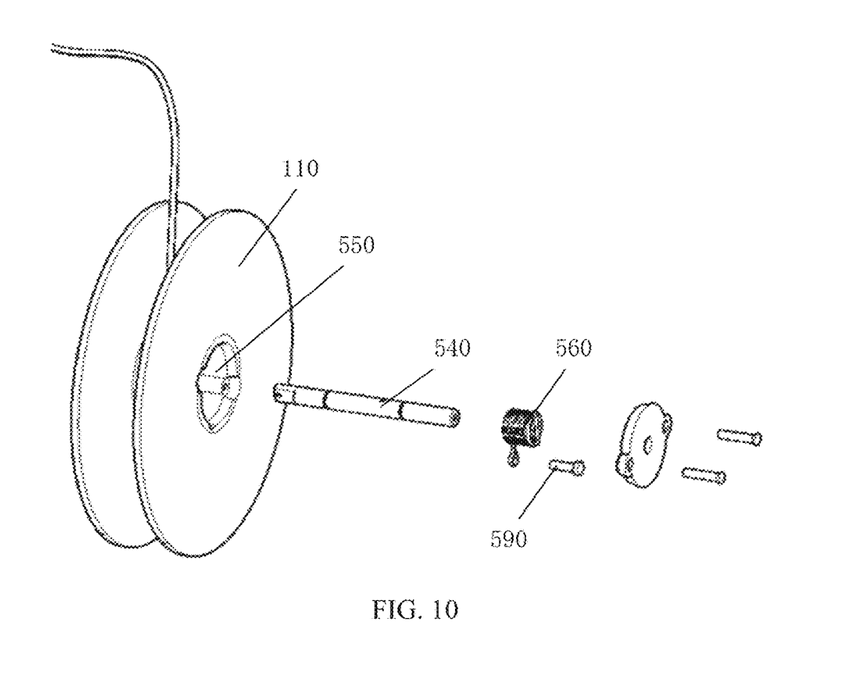
FIG. 10 is an exploded view of a wire wheel transmission structure according to the present invention.
Figure 11:
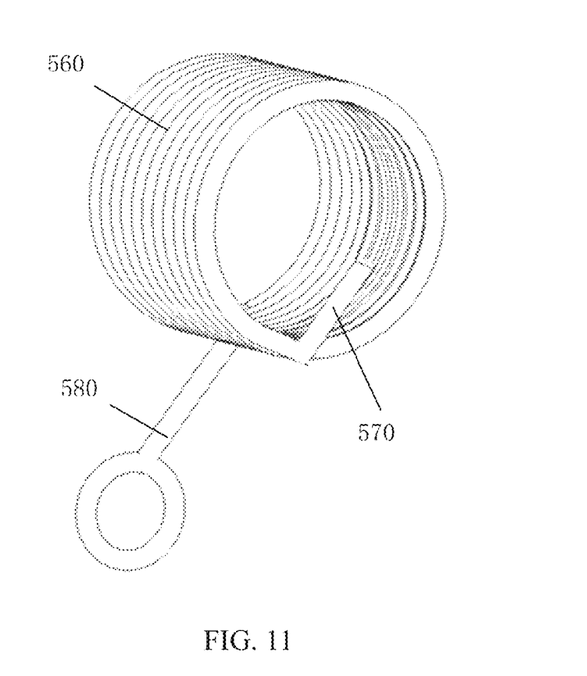
FIG. 11 is a schematic diagram of a structure of a transmission torsion spring according to the present invention.

Referring to FIG. 9, in an optional embodiment of the present invention, the wire wheel bin 50 and the electric bin 60 are separated by a second partition plate 530, a transmission shaft 540 is disposed at the center of the second partition plate 530 in a penetrating manner, referring to FIG. 10, a torsion spring mounting groove 550 is disposed at the center of the wire wheel 110, a transmission torsion spring 560 is disposed in the torsion spring mounting groove 550, the transmission shaft 540 penetrates through a bottom of the torsion spring mounting groove 550 and the transmission torsion spring 560, referring to FIG. 11, the transmission torsion spring 560 comprises an inward-folding support arm 570 and an outward-extending support arm 580, the inward-folding support arm 570 is disposed on the transmission shaft 540 in a penetrating manner, a hanging rod 590 is disposed at the bottom of the torsion spring mounting groove 550 near the transmission torsion spring 560, the outward-extending support arm 580 is connected to the hanging rod 590, and the transmission shaft 540 drives the wire wheel 110 to rotate through the transmission torsion spring 560.

In an optional embodiment of the present invention, the wire wheel clutch driving device is further disposed in the electric bin 60, referring to FIG. 9, the wire wheel clutch driving device comprises a cover-shaped mounting seat 610 mounted on the second partition plate 530 and covering a region where the transmission shaft 540 is located, a driven gear 620 and a driving gear 630 that are enclosed between the cover-shaped mounting seat 610 and the second partition plate 530 and are in internal meshing transmission, a take-up motor 640 configured to drive the driving gear 630 to rotate, and a clutch control mechanism configured to control the meshing or separation of the driving gear 630 and the driven gear 620; the clutch control mechanism comprises a motor fixing seat 660 that is disposed on the cover-shaped mounting seat 610 in a swinging mode and is provided with an extending swing arm 650, a tension spring 670 of which two ends are respectively connected to the motor fixing seat 660 and an inner side wall of the electric bin 60 and that is configured to keep the driven gear 620 and the driving gear 630 meshed, and an eccentric wheel clutch control assembly 680 that is configured to fit the extending swing arm 650 of the motor fixing seat 660 to control the operation of the driving gear 630 and the driven gear 620; and specifically, referring to FIG. 9, a rotation hole 1600 is disposed at one end of the motor fixing seat 660 that is away from the extending swing arm 650, the cover-shaped mounting seat 610 is provided with a rotation post 1700 adapted to the rotation hole, and the motor fixing seat 660 is connected to the cover-shaped mounting seat 610 through the rotation post 1700 and the rotation hole 1600 in a swinging manner.

The driving gear and the driven gear of the wire wheel clutch driving device use internal meshing transmission, compared with external meshing transmission, the internal meshing transmission has a small transmission stress and small abrasion, and the driving gear 630 and the driven gear 620 are changed from the original position at an outer side of the wire wheel bin 50 to the position at an inner side thereof, so that the transmission of the driving gear 630 and the driven gear 620 is not easy to loosen under the limiting action of the cover-shaped mounting seat 610, and the reliability is higher.

Figure 12:
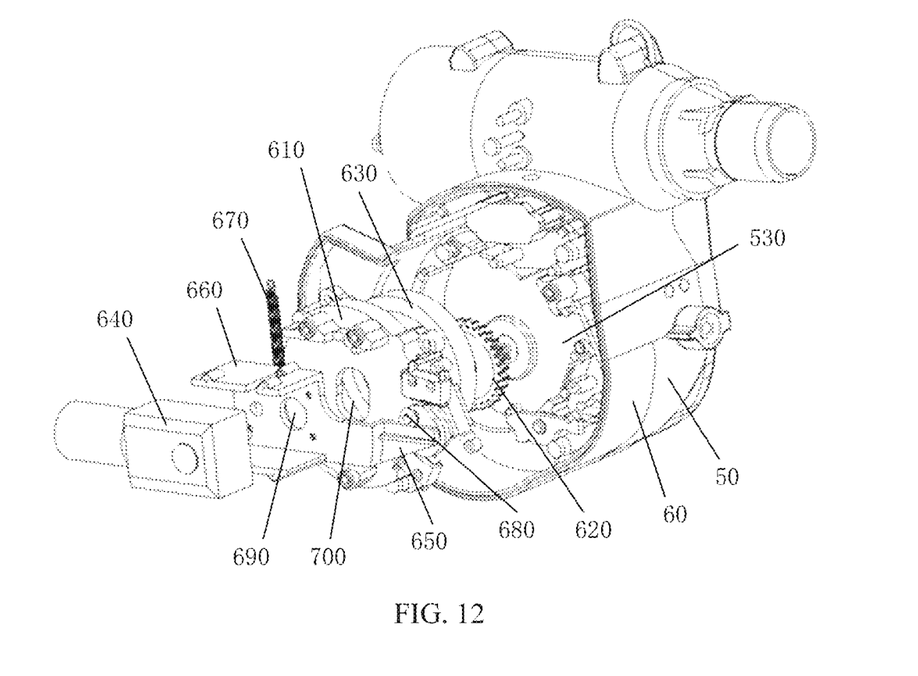
FIG. 12 is an exploded view of an electric bin of a take-up and pay-off main machine that has a cover at one side opened according to a second perspective of the present invention.
Figure 13:
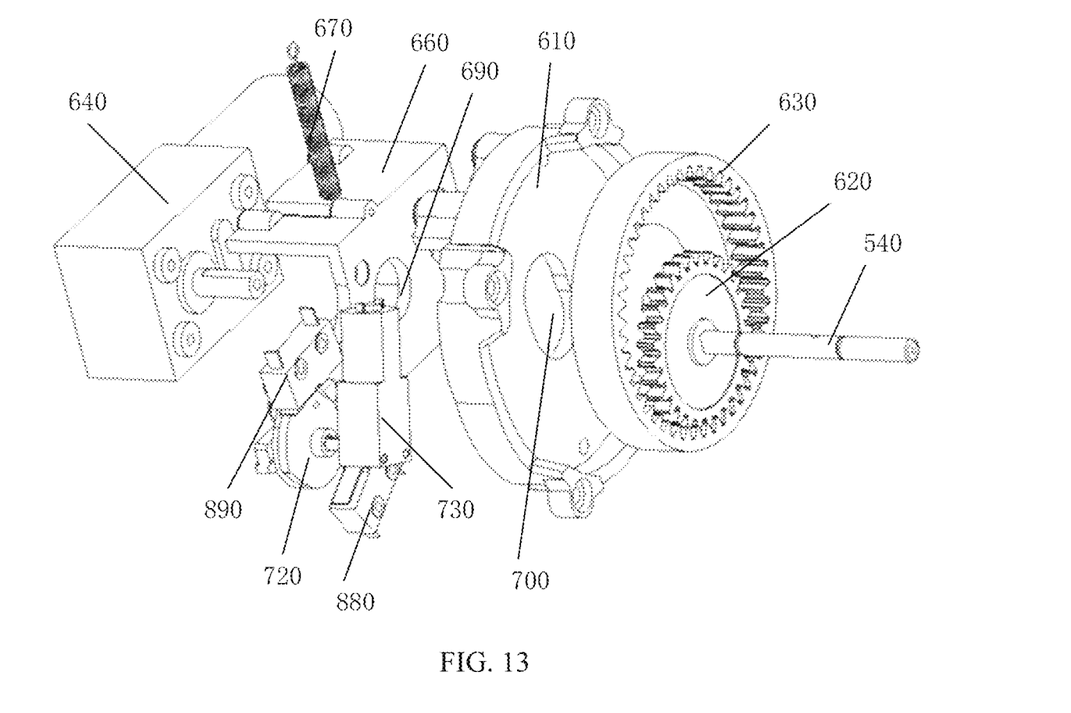
FIG. 13 is an exploded view of a wire wheel clutch driving device according to the present invention.

Referring to FIGS. 12 and 13, the take-up motor 640 is mounted on the motor fixing seat 660, and an output shaft of the take-up motor 640 penetrates through a shaft through hole 690 in the motor fixing seat 660 and a shaft swinging hole 700 in the cover-shaped mounting seat 610 and is connected to the driving gear 630. In the present invention, the shape of the shaft swinging hole 700 is waist circular, and the shaft swinging hole 700 functions to provide enough movement space for the output shaft when the take-up motor 640 swings.

Figure 14:
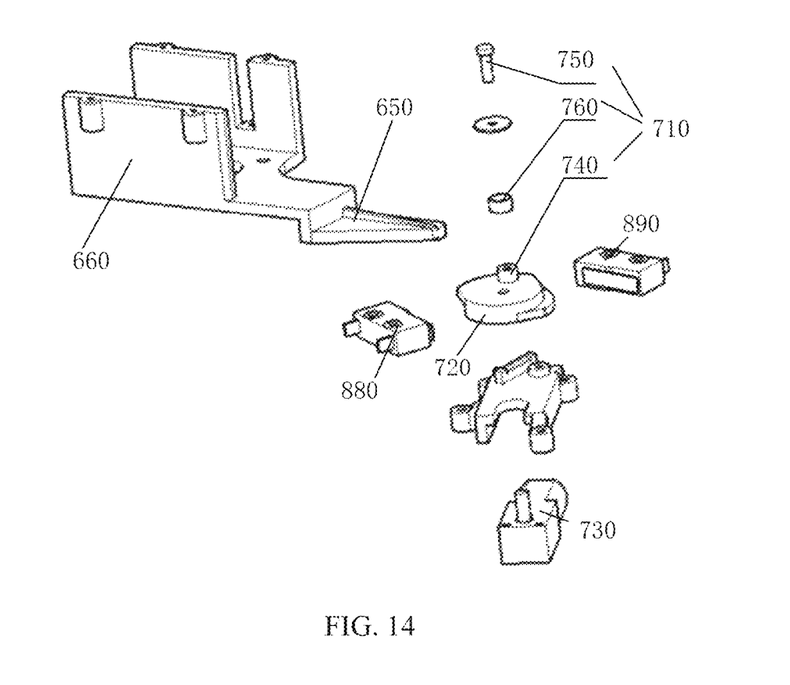
FIG. 14 is an exploded view of an eccentric wheel clutch control assembly according to the present invention.

Referring to FIG. 14, in an optional embodiment of the present invention, the eccentric wheel clutch control assembly comprises a second eccentric wheel 720 with a second push rod 710 and a clutch motor 730 configured to drive the second eccentric wheel 720 to rotate, the second push rod 710 comprises a second screw seat 740 integrally formed on an outer edge of the second eccentric wheel 720, a second screw 750 connected to the second screw seat 740, and a second sleeve 760 sleeved on the second screw 750, and the second push rod 710 is in contact with the extending swing arm 650 of the motor fixing seat 660 through the second sleeve 760. In the present invention, the first push rod 260 has the same structure as the second push rod 710.

In the present invention, the clutch motor 730 can rotate clockwise or counterclockwise, when the clutch motor 730 rotates counterclockwise, the second eccentric wheel 720 also rotates counterclockwise, the second push rod 710 pushes the extending swing arm 650 to separate the motor fixing seat 660 with the driving gear 630 and the driven gear 620 connected to the output shaft of the clutch motor 730, so as to disconnect transmission, when transmission needs to be recovered, the clutch motor 730 rotates clockwise, the motor fixing seat 660 swings upwards under the action of the tension spring until the second push rod 710 is separated from the extending swing arm 650, and the tension spring drives the motor fixing seat 660 to mesh the driving gear 630 and the driven gear 620 connected to the output shaft of the clutch motor 730, so as to recover transmission connection.

Figure 15:
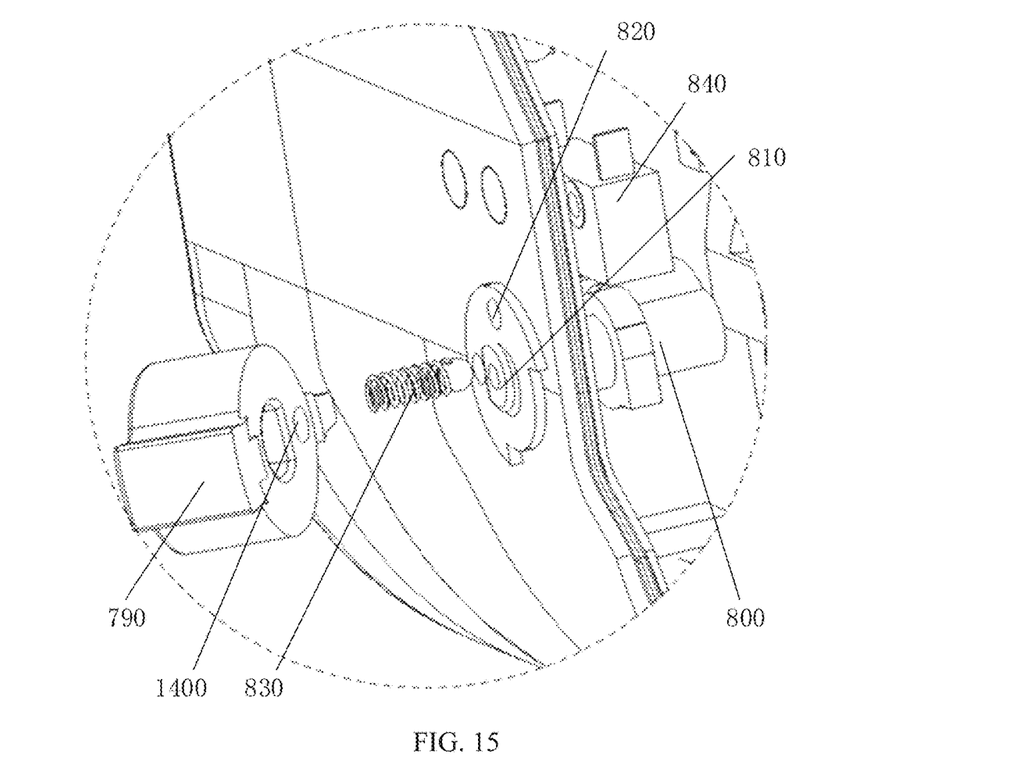
FIG. 15 is an exploded view of a main power supply knob according to the present invention.

Referring to FIG. 2, in an optional embodiment of the present invention, a main power supply knob 780 is disposed on the wire wheel bin 50, referring to FIG. 15, the main power supply knob 780 comprises a knob portion 790, a cam portion 800, and a connecting shaft portion 810 configured to connect the knob portion 790 and the cam portion 800, the knob portion 790 is disposed outside the wire wheel bin 50, the cam portion 800 is disposed inside the wire wheel bin 50, the connecting shaft portion 810 penetrates through a side wall of the wire wheel bin 50, a plurality of positioning pits 820 are disposed on an outer wall of the wire wheel bin 50 corresponding to the knob portion 790, a positioning groove 1400 adapted to the positioning pit 820 is disposed on the knob portion 790, a steel ball spring gear-shifting limiting mechanism 830 is disposed in the positioning groove 1400, and the wire wheel bin 50 is further provided with a first microswitch 840 configured to trigger the cam portion 800. In the present invention, the cam portion 800 controls the first microswitch 840 and also simultaneously acts on the lifting plate of the first electromagnet 370 to lift the lifting rod 380, so that the brake on the wire wheel 110 is released when the entire threading device is powered off, thereby facilitating the internal maintenance of the threading device.

Figure 16:
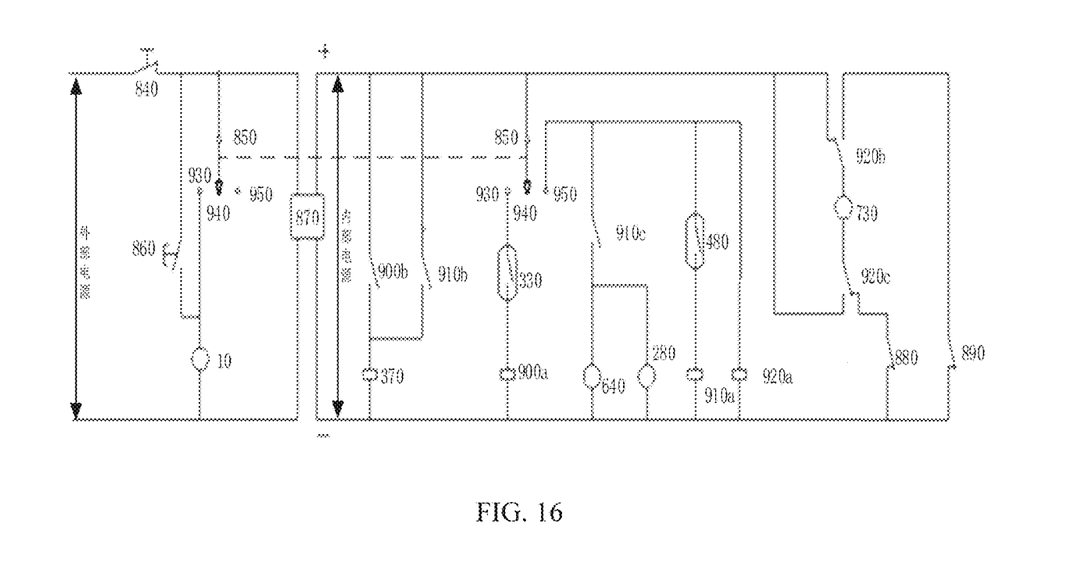
FIG. 16 is a schematic diagram of a principle of a take-up and pay-off switch circuit according to the present invention.

Referring to FIG. 16, in an optional embodiment of the present invention, the take-up and pay-off main machine 20 further comprises a take-up and pay-off switch circuit, and the take-up and pay-off switch circuit comprises a three-gear adjusting operation switch 850 (also referring to FIG. 9, the ventilation bin 40 is provided with a lifting handle, and the three-gear adjusting operation switch 850 is disposed on the lifting handle), an air blowing button 860 (also referring to FIG. 9, similarly, the air blowing button 860 is also disposed on the lifting handle), the main power supply knob 780, the first microswitch 840 (normally closed, contact-opening), a power supply conversion module 870 (disposed in the electric bin 60), a second microswitch 880 (also referring to FIG. 13, normally closed, contact-opening), a third microswitch 890 (also referring to FIG. 13, normally closed, contact-opening), the first electromagnet 370, the fan 10, the take-up motor 640, the clutch motor 730, the first switch-type Hall sensor 330, the second switch-type Hall sensor 480, a first direct-current relay 900 (shown in FIG. 9, comprising a second electromagnet 900a (referring to FIG. 16) and a first contact switch 900b (referring to FIG. 16)), a second direct-current relay 910 (shown in FIG. 9, comprising a third electromagnet 910a (referring to FIG. 16), a second contact switch 910b (referring to FIG. 16) and a third contact switch 910c (referring to FIG. 16)), and a third direct-current relay 920 (shown in FIG. 9, comprising a fourth electromagnet 920a (referring to FIG. 16), a fourth contact switch 920b (referring to FIG. 16) and a fifth contact switch 920c (referring to FIG. 16)); and the three-gear adjusting operation switch 850 comprises a threading gear 930, a standby gear 940 and a take-up gear 950; and the power supply conversion module 870 is configured to enable an external power supply connected by a plug to perform alternating current-direct current conversion and voltage step-down into an internal power supply.

When the threading device is used, the main power supply knob 780 is rotated to switch on the first microswitch 840 and connect an external power supply; the threading device is initially connected to the external power supply, the clutch motor 730 is in a state of pushing the driving gear 630 and the driven gear 620 to be separated, and both the forward rotation circuit and the reverse rotation circuit of the clutch motor 730 are in an incompletely conducting state (wherein the second microswitch 880 on the reverse rotation circuit is in a switch-off state under the contact of the second eccentric wheel 720, and the third microswitch 890 on the forward rotation circuit is in a normally closed state).

Figure 17:
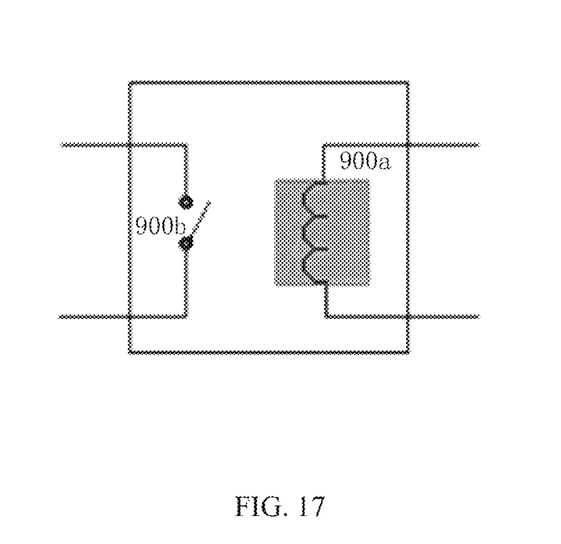
FIG. 17 is a simplified diagram of a four-pin relay according to the present invention.

When the three-gear adjusting operation switch 850 is switched from the standby gear 940 to the threading gear 930, the fan 10 is conducted with the external power supply, the air door 450 rotates under the action of wind power of the fan 10, and the second magnet 470 of the air door 450 is close to the second switch-type Hall sensor 480; the second switch-type Hall sensor 480 is closed, and the second electromagnet 900a of the first direct-current relay 900 (a four-pin relay, the structure of which can be seen in FIG. 17, comprising the second electromagnet 900a and the first contact switch 900b) is conducted with the internal power supply; a second electromagnet 900a drives a first contact switch 900b of the first direct-current relay 900 to be closed and conduct the first electromagnet 370, so that the lifting rod 380 drives the brake pad 350 to release the brake on the wire wheel 110.

When the three-gear adjusting operation switch 850 is switched from the threading gear 930 to the standby gear 940, the fan 10 is powered off, and the second electromagnet 900a of the first direct-current relay 900 is also powered off; the first contact switch 900b of the first direct-current relay 900 is switched off, and the first electromagnet 370 is powered off; and the brake pad 350 restores the brake on the wire wheel 110.

Figure 18:
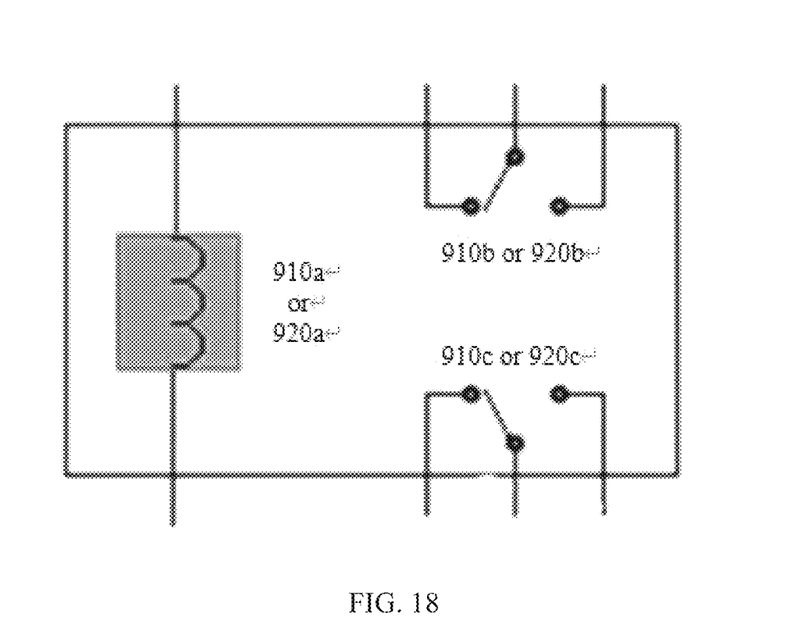
FIG. 18 is a simplified diagram of an eight-pin relay according to the present invention.

When the three-gear adjusting operation switch 850 is switched from the standby gear 940 to the take-up gear 950, the bent pipe converging device 130 is initially in an original position, the first magnet 320 on the magnetic sleeve 310 is close to the first switch-type Hall sensor 330, and the first switch-type Hall sensor 330 is closed; a third electromagnet 910a of the second direct-current relay 910 (an eight-pin relay, for example, an eight-pin direct-current relay of GOLDEN model GA-2C-12L, the structure of which can be seen in FIG. 18, comprising a third electromagnet 910, second contact switches 910b (only two middle pin and left (or right) pin are used) and a third contact switch 910c (similarly, only 2 middle pin and left (or right)) pin are used) is conducted with the internal power supply; the third electromagnet 910a drives a second contact switch 910b of the second direct-current relay 910 to switch to conduct the first electromagnet 370, so that the lifting rod 380 drives the brake pad 350 to release the brake on the wire wheel 110; the third electromagnet 910a drives a third contact switch 910c of the second direct-current relay 910 to switch to conduct the take-up motor 640 and the rope arrangement motor 280; synchronously, a fourth electromagnet 920a of the third direct-current relay 920 (an eight-pin relay, comprising a fourth electromagnet 920a (having the same structure as the third electromagnet 910a), a fourth contact switch 920b (having the same structure as the second contact switch 910b, and three pins are all used, and one end of the clutch motor 730 is connected to the middle pin of the fourth contact switch) and a fifth contact switch 920c (having the same structure as the third contact switch 910c, and three pins are all used, and the other end of the clutch motor 730 is connected to the middle pin of the fifth contact switch 920c)) is conducted, and the fourth electromagnet 920a drives a fourth contact switch 920b and a fifth contact switch 920c of the third direct-current relay 920 to switch to conduct a forward rotation circuit of the clutch motor 730; and the clutch motor 730 rotates forwards until the second eccentric wheel 720 on the clutch motor 730 is in contact with the third microswitch 890, and the forward rotation circuit is disconnected.

After the above actions are completed, the wire wheel 110 starts to take up wire under the driving of the take-up motor 640, when the wire is tightened, the bent pipe converging device 130 rotates downward to drive the first magnet 320 on the magnetic sleeve 310 to be away from the first switch-type Hall sensor 330, the first switch-type Hall sensor 330 disconnects the power supply of the third electromagnet 910a, the second contact switch 910b disconnects the power supply of the first electromagnet 370, the wire wheel 110 brakes, meanwhile, the third contact switch 910c disconnects the power supply of the take-up motor 640 and the rope arrangement motor 280, the take-up motor 640 and the rope arrangement motor 280 stop, when the wire is loosened, the bent pipe converging device 130 rotates upward and returns to its position, the first switch-type Hall sensor 330 is closed to conduct the third electromagnet 910a, the second contact switch 910b is closed again to recover the power supply of the first electromagnet 370, the brake of the wire wheel 110 is released, meanwhile, the third contact switch 910c is closed again to recover the power supply of the take-up motor 640 and the rope arrangement motor 280, the wire wheel 110 is driven to take up, and the actions are repeated along with the tightening and loosening of the wire rope in the take-up process.

When the three-gear adjusting operation switch 850 is switched from the take-up gear 950 to the standby gear 940, the fourth electromagnet 920a of the third direct-current relay 920 is powered off, and the fourth electromagnet 920a drives the fourth contact switch 920b and the fifth contact switch 920c of the third direct-current relay 920 to switch to conduct the reverse rotation circuit of the clutch motor 730; the clutch motor 730 rotates reversely until the second eccentric wheel 720 on the clutch motor 730 is in contact with the second microswitch 880, and a reverse rotation circuit is disconnected.

When only air blowing is needed, the three-gear adjusting operation switch 850 is located at the standby gear 940, the air blowing button 860 is pressed, the air blowing button 860 enables the fan 10 to be conducted with the external power supply, and the fan 10 is powered on to blow air.

When maintenance is needed, the main power supply knob 780 is rotated to switch off the first microswitch 840 and disconnect the external power supply.

Generally speaking, the threading device of the present invention has made the following technical upgrade for the existing threading device.

1.1: The structure of the bent pipe converging device 130 is improved, so that the bent pipe converging device is easy to manufacture, and the left and right deflection function is added on the basis of the original up and down deflection, so that the bent pipe converging device is configured to combine the rope arrangement auxiliary device 210 to enable the wire ropes to be sequentially arranged on the wire wheel 110.

1.2: The microswitch controlled by the original bent pipe converging device is updated to a magnetic control sensor, so that mechanical contact is avoided, and the stability and the reliability are improved.

1.3: The rope arrangement auxiliary device 210 is increased, which eliminates the stacking and clamping problems of the wire rope when it is stored in the wire wheel 110, and makes the entire system smoother during take-up and pay-off.

1.4: The original driving gear 630 and driven gear 620 are updated to the internal meshing transmission, which saves structure space and increases the gear life.

1.5: The original discrete relay is updated to a printed circuit board PCB, which saves the structural space and improves the circuit reliability.

1.6: The sucker-type electromagnet braking mechanism is updated to a frame-type electromagnet and brake pad 350 mechanism, which improves the braking reliability and sensitivity.

1.7: The original screw type clutch driving mechanism is updated to an eccentric wheel clutch driving mechanism, which improves reliability and sensitivity.

1.8: An air door 450 and an air door 450 sensor are added, so that the entire system has the functions of automatically braking the wire wheel 110 when a pipeline is blocked and preventing wire disorder caused by excessive paying-off.

1.9: The air blowing button 860 is added, so that the entire system has the function of common air blower 10, which is used for blowing away accumulated water and rubbish in the pipeline, and is convenient to find pipeline outlet or clean up rubbish at the construction site.

1.10: The original circuit schematic diagram is updated, a capacitor is canceled, and a confluence sensor, an air door 450 sensor, an air blowing button 860 switch, a power supply main switch, a rope arrangement motor and the like are added.

1.11: The original handle structure is updated, so that the operation comfort of the entire system is more reasonable.

1.12: The maintenance switch is increased, when the maintenance switch is turned to the maintenance gear, the main power supply of the entire system can be disconnected, and the braking system of the wire wheel 110 is released, so as to facilitate the strong maintenance.

1.13: The structure of the entire system casing and various system components has been greatly improved, which makes the performance of the entire system more reliable and sensitive.

Although the present invention has been disclosed above with preferred embodiments, the above preferred embodiments are not intended to limit the present invention, and those of ordinary skill in the art can make various changes and modifications without departing from the spirit and scope of the present invention. Therefore, the protection scope of the present invention shall be subject to the scope defined by the claims.

The invention claimed is:

1. A threading device, comprising: a fan, a take-up and pay-off main machine and a connecting hose, wherein the take-up and pay-off main machine comprises a ventilation bin, a wire wheel bin and an electric bin; a fan connector and a hose connector are disposed on the ventilation bin, an air channel communicating with the fan connector and the hose connector is disposed in the ventilation bin, the connecting hose is connected to the hose connector, and the fan is connected to the fan connector; the electric bin and the wire wheel bin are coaxially disposed side by side, the ventilation bin is communicated with a side wall of the wire wheel bin, a first partition plate is disposed between the ventilation bin and the wire wheel bin, a wire wheel is disposed in the wire wheel bin, a wire wheel clutch driving device is disposed in the electric bin, a bent pipe converging device is disposed in the ventilation bin through a first rotating shaft, a converging device lifting torsion spring penetrates through the first rotating shaft, and a bent pipe through hole configured for the bent pipe converging device to penetrate through is disposed on the first partition plate, wherein an arc-shaped first clamping portion is disposed on the first rotating shaft, a first sleeve is disposed on the first clamping portion, an outward outlet of the bent pipe converging device is disposed in the first sleeve in a penetrating manner and is in clearance fit with the first sleeve, an annular groove is disposed in the bent pipe converging devices at two ends of the first sleeve, and a first annular gasket and a clamp spring that are configured to prevent the bent pipe converging device from being separated from the first sleeve are disposed in the annular groove; one end of the converging device lifting torsion spring is inserted into an inner wall of the ventilation bin, and the other end of the converging device lifting torsion spring is lapped on the first sleeve;

a rope arrangement auxiliary device is disposed at the bent pipe through hole of the first partition plate and comprises a rope arrangement plate and a reciprocating driving assembly of the rope arrangement plate, a first sliding groove and a second sliding groove are disposed on the rope arrangement plate in parallel, a sliding direction of the first sliding groove and the second sliding groove is perpendicular to a reciprocating direction of the rope arrangement plate, and an inward outlet of the bent pipe converging device penetrates through the first sliding groove; and the reciprocating driving assembly of the rope arrangement plate comprises a first eccentric wheel with a first push rod and a rope arrangement motor configured to drive the first eccentric wheel to rotate, the first push rod of the first eccentric wheel is inserted into the second sliding groove, and the reciprocating driving assembly of the rope arrangement plate is disposed in the electric bin.

2. The threading device according to claim 1, wherein an L-shaped magnetic sleeve mounting bracket is disposed on the first sleeve, an arc-shaped second clamping portion is disposed at one end of the L-shaped magnetic sleeve mounting bracket, a magnetic sleeve is connected to the other end of the L-shaped magnetic sleeve mounting bracket, the L-shaped magnetic sleeve mounting bracket is fixed on the first sleeve through the second clamping portion, a first magnet is disposed on the magnetic sleeve, a first switch-type Hall sensor configured to fit the first magnet is disposed on the inner wall of the ventilation bin, and the converging device lifting torsion spring is indirectly lapped on the first sleeve through the L-shaped magnetic sleeve mounting bracket.

3. The threading device according to claim 2, wherein a wire wheel braking device is further provided in the wire wheel bin, and the wire wheel braking device comprises a brake pad rotatably connected in the wire wheel bin and disposed adjacent to the wire wheel, a brake pad deflecting torsion spring configured to drive the brake pad to rotate so as to contact with an outer periphery of the wire wheel, and a first electromagnet and a lifting rod configured to drive the brake pad to separate from the outer periphery of the wire wheel against an elastic force of the brake pad deflecting torsion spring by rising and lifting;

the brake pad comprises a first L-shaped connecting sheet and a second L-shaped connecting sheet that are symmetrically disposed in parallel, and friction sheets that are connected to a right-angle position of the first L-shaped connecting sheet and a right-angle position of the second L-shaped connecting sheet; the first L-shaped connecting sheet and the second L-shaped connecting sheet are rotatably connected in the wire wheel bin in an inverted L shape by using a second rotating shaft; a cross rod is disposed at ends that are of the first L-shaped connecting sheet and the second L-shaped connecting sheet and that are in a non-rotating connection in a penetrating manner;

the electromagnet is disposed above the brake pad, and the lifting rod penetrates through a gap enclosed by the cross rod, the first L-shaped connecting sheet, the second L-shaped connecting sheet and the friction sheet; and an inclined plane configured to drive the friction sheet to be separated from the wire wheel by squeezing and pushing the cross rod when the lifting rod rises is disposed at one end of the lifting rod penetrating through the gap.

4. The threading device according to claim 3, wherein an air door pay-off control device is disposed in the ventilation bin at one side of the fan connector, and the air door pay-off control device comprises an air door rotatably disposed in an air inlet of the ventilation bin through a side rotating shaft, an air door torsion spring sleeved on the side rotating shaft and configured to drive the air door to close the air inlet, a second magnet disposed on a lower edge of the air door, and a second switch-type Hall sensor disposed at a bottom of the ventilation bin and configured to fit the second magnet.

5. The threading device according to claim 4, wherein a first clamping groove and a second clamping groove are disposed at a top of a side wall and a bottom of a side wall of the ventilation bin at one side of the fan connector, respectively; a top end and a bottom end of the side rotating shaft are clamped into the first clamping groove and the second clamping groove, respectively; and a first pressing cover configured to limit the separation of the top end of the side rotating shaft from the first clamping groove is disposed on the first clamping groove, and a second pressing cover configured to limit the separation of the bottom end of the side rotating shaft from the second clamping groove is disposed on the second clamping groove.

6. The threading device according to claim 4, wherein the wire wheel bin and the electric bin are separated by a second partition plate, a transmission shaft is disposed at the center of the second partition plate in a penetrating manner, a torsion spring mounting groove is disposed at the center of the wire wheel, a transmission torsion spring is disposed in the torsion spring mounting groove, the transmission shaft penetrates through a bottom of the torsion spring mounting groove and the transmission torsion spring, the transmission torsion spring comprises an inward-folding support arm and an outward-extending support arm, the inward-folding support arm is disposed on the transmission shaft in a penetrating manner, a hanging rod is disposed at the bottom of the torsion spring mounting groove near the transmission torsion spring, the outward-extending support arm is connected to the hanging rod, and the transmission shaft drives the wire wheel to rotate through the transmission torsion spring.

7. The threading device according to claim 6, wherein the wire wheel clutch driving device is further disposed in the electric bin, and comprises a cover-shaped mounting seat mounted on the second partition plate and covering a region where the transmission shaft is located, a driven gear and a driving gear that are enclosed between the cover-shaped mounting seat and the second partition plate and are in internal meshing transmission, a take-up motor configured to drive the driving gear to rotate, and a clutch control mechanism configured to control the meshing or separation of the driving gear and the driven gear;

the clutch control mechanism comprises a motor fixing seat that is disposed on the cover-shaped mounting seat in a swinging mode and is provided with an extending swing arm, a tension spring of which two ends are respectively connected to the motor fixing seat and an inner side wall of the electric bin and that is configured to keep the driven gear and the driving gear meshed, and an eccentric wheel clutch control assembly that is configured to fit the extending swing arm of the motor fixing seat to control the operation of the driving gear and the driven gear; and the take-up motor is mounted on the motor fixing seat, and an output shaft of the take-up motor penetrates through a shaft through hole in the motor fixing seat and a shaft swinging hole in the cover-shaped mounting seat and is connected to the driving gear.

8. The threading device according to claim 7, wherein the eccentric wheel clutch control assembly comprises a second eccentric wheel with a second push rod and a clutch motor configured to drive the second eccentric wheel to rotate, the second push rod comprises a second screw seat integrally formed on an outer edge of the second eccentric wheel, a second screw connected to the second screw seat, and a second sleeve sleeved on the second screw, and the second push rod is in contact with the extending swing arm of the motor fixing seat through the second sleeve.

9. The threading device according to claim 8, wherein a main power supply knob is disposed on the wire wheel bin, the main power supply knob comprises a knob portion, a cam portion, and a connecting shaft portion configured to connect the knob portion and the cam portion, the knob portion is disposed outside the wire wheel bin, the cam portion is disposed inside the wire wheel bin, the connecting shaft portion penetrates through a side wall of the wire wheel bin, a plurality of positioning pits are disposed on an outer wall of the wire wheel bin corresponding to the knob portion, a positioning groove adapted to the positioning pit is disposed on the knob portion, a steel ball spring gear-shifting limiting mechanism is disposed in the positioning groove, and the wire wheel bin is further provided with a first microswitch configured to trigger the cam portion.

10. The threading device according to claim 9, wherein the take-up and pay-off main machine further comprises a take-up and pay-off switch circuit, and the take-up and pay-off switch circuit comprises a three-gear adjusting operation switch, an air blowing button, the main power supply knob, the first microswitch, a power supply conversion module, a second microswitch, a third microswitch, the first electromagnet, the fan, the take-up motor, the clutch motor, the first switch-type Hall sensor, the second switch-type Hall sensor, a first direct-current relay, a second direct-current relay, and a third direct-current relay; the three-gear adjusting operation switch comprises a threading gear, a standby gear and a take-up gear; and the power supply conversion module is configured to enable an external power supply connected by a plug to perform alternating current-direct current conversion and voltage step-down into an internal power supply;

when the threading device is used, the main power supply knob is rotated to switch on the first microswitch and power on the external power supply;

when the three-gear adjusting operation switch is switched from the standby gear to the threading gear, the fan is conducted with the external power supply, the air door rotates under the action of wind power of the fan, and the second magnet of the air door is close to the second switch-type Hall sensor; the second switch-type Hall sensor is closed, and the second electromagnet of the first direct-current relay is conducted with the internal power supply; a second electromagnet drives a first contact switch of the first direct-current relay to be closed and conduct the first electromagnet, so that the lifting rod drives the brake pad to release the brake on the wire wheel;

when the three-gear adjusting operation switch is switched from the threading gear to the standby gear, the fan is powered off, and the second electromagnet of the first direct-current relay is also powered off; the first contact switch of the first direct-current relay is switched off, and the first electromagnet is powered off; the brake pad restores the brake on the wire wheel;

when the three-gear adjusting operation switch is switched from the standby gear to the take-up gear, the bent pipe converging device is initially in an original position, the first magnet on the magnetic sleeve is close to the first switch-type Hall sensor, and the first switch-type Hall sensor is closed; a third electromagnet of the second direct-current relay is conducted with the internal power supply; the third electromagnet drives a second contact switch of the second direct-current relay to switch to conduct the first electromagnet, so that the lifting rod drives the brake pad to release the brake on the wire wheel; the third electromagnet drives a third contact switch of the second direct-current relay to switch to conduct the take-up motor and the rope arrangement motor; synchronously, a fourth electromagnet of the third direct-current relay is conducted, and the fourth electromagnet drives a fourth contact switch and a fifth contact switch of the third direct-current relay to switch to conduct a forward rotation circuit of the clutch motor; the clutch motor rotates forwards until the second eccentric wheel on the clutch motor is in contact with the third microswitch, and the forward rotation circuit is disconnected;

when the three-gear adjusting operation switch is switched from the take-up gear to the standby gear, the fourth electromagnet of the third direct-current relay is powered off, and the fourth electromagnet drives the fourth contact switch and the fifth contact switch of the third direct-current relay to switch to conduct the reverse rotation circuit of the clutch motor; the clutch motor rotates reversely until the second eccentric wheel on the clutch motor is in contact with the second microswitch, and a reverse rotation circuit is disconnected;

when only air blowing is needed, the three-gear adjusting operation switch is located at the standby gear, the air blowing button is pressed, the air blowing button enables the fan to be conducted with the external power supply, and the fan is powered on to blow air; and when maintenance is needed, the main power supply knob is rotated to switch off the first microswitch and disconnect the external power supply.

* * * * *